United States Patent [19]

Harper et al.

[11] 3,835,610

[45] Sept. 17, 1974

[54] JOINT FOR JOINING STRUCTURAL MEMBERS

[75] Inventors: Ronald Ernest Harper, Monkton Combe; Michael James Mole, Corsham, both of England

[73] Assignee: Arkana Limited, Bath, England

[22] Filed: June 28, 1972

[21] Appl. No.: 267,199

[52] U.S. Cl.............. 52/755, 52/753 F, 52/753 D, 403/231, 403/409, 403/171
[51] Int. Cl............................................ F16b 12/24
[58] Field of Search... 287/20.92 E, 20.924, 20.926, 287/20.927, DIG. 8, 20.92 C, 20.92 Y, 189.36 H, 20.92 J, 20.92 W; 52/583, 584, 585, 285, 127, 753 C, 753 D, 753 E, 753 F, 753 G, 754, 755, 756, 757; 108/64, 153; 297/440; 312/257 R, 263, 195; 403/171, 176, 231, 219, 409

[56] References Cited
UNITED STATES PATENTS

| | | | |
|---|---|---|---|
| 1,098,917 | 6/1914 | Norcross et al...................... 20/92.7 |
| 2,240,395 | 4/1941 | Evans............................ 287/20.924 |
| 2,340,864 | 2/1944 | Carpenter........................ 52/753 G |
| 2,442,184 | 5/1948 | Summers ............................ 52/583 |
| 2,540,468 | 2/1951 | Anderson..................... 287/20.92 C |
| 2,648,248 | 8/1953 | Cederquist ...................... 52/753 F |
| 3,410,584 | 11/1968 | Bus................................ 287/20.925 |
| 3,537,736 | 11/1970 | Kroopp................................. 52/584 |
| 3,567,260 | 3/1971 | Norris............................ 287/20.924 |
| 3,654,879 | 8/1972 | Ferdinand et al.................... 108/111 |

FOREIGN PATENTS OR APPLICATIONS

| | | |
|---|---|---|
| 942,043 | 9/1948 | France |
| 743,259 | 1/1956 | Great Britain |
| 119,909 | 7/1968 | France................................. 52/756 |
| 1,491,842 | 7/1967 | France............................... 403/316 |

Primary Examiner—Jordan Franklin
Assistant Examiner—Conrad L. Berman
Attorney, Agent, or Firm—Cushman, Darby & Cushman

[57] ABSTRACT

Structural members are connected by a joining device which is attached to one of the members and has an insert part projecting therefrom for insertion into a cavity in another structural member. The insert part has a shoulder arranged to lie within the cavity facing the first structural member, and a pin passes through an aperture in the second structural member to abut with the shoulder to retain the insert part within the cavity. The pin preferably has a cross-section shape so as to urge the insert part further into the cavity on rotation of the pin. The device may be attached to the first structural member by screw means.

11 Claims, 8 Drawing Figures

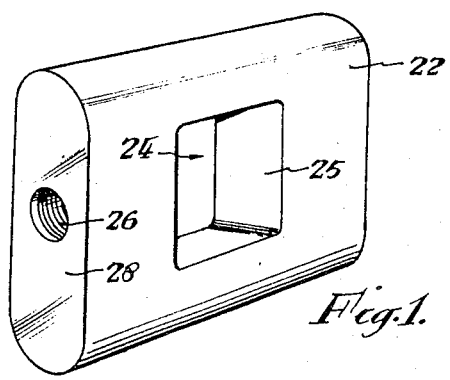
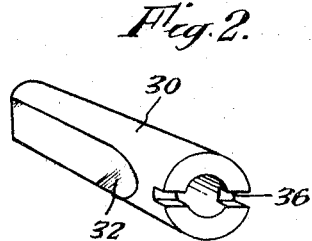
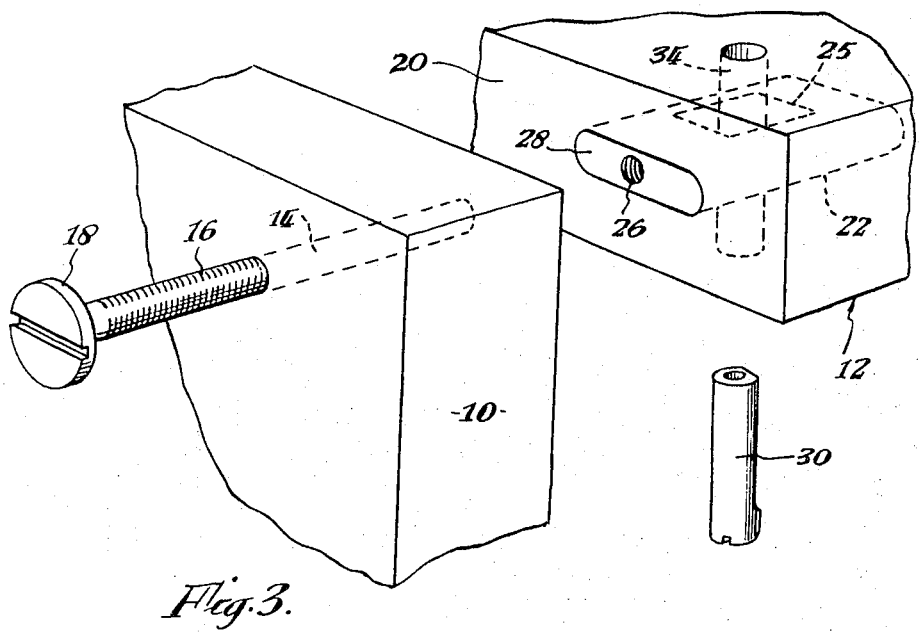
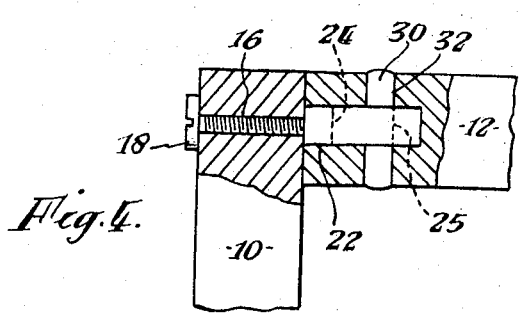

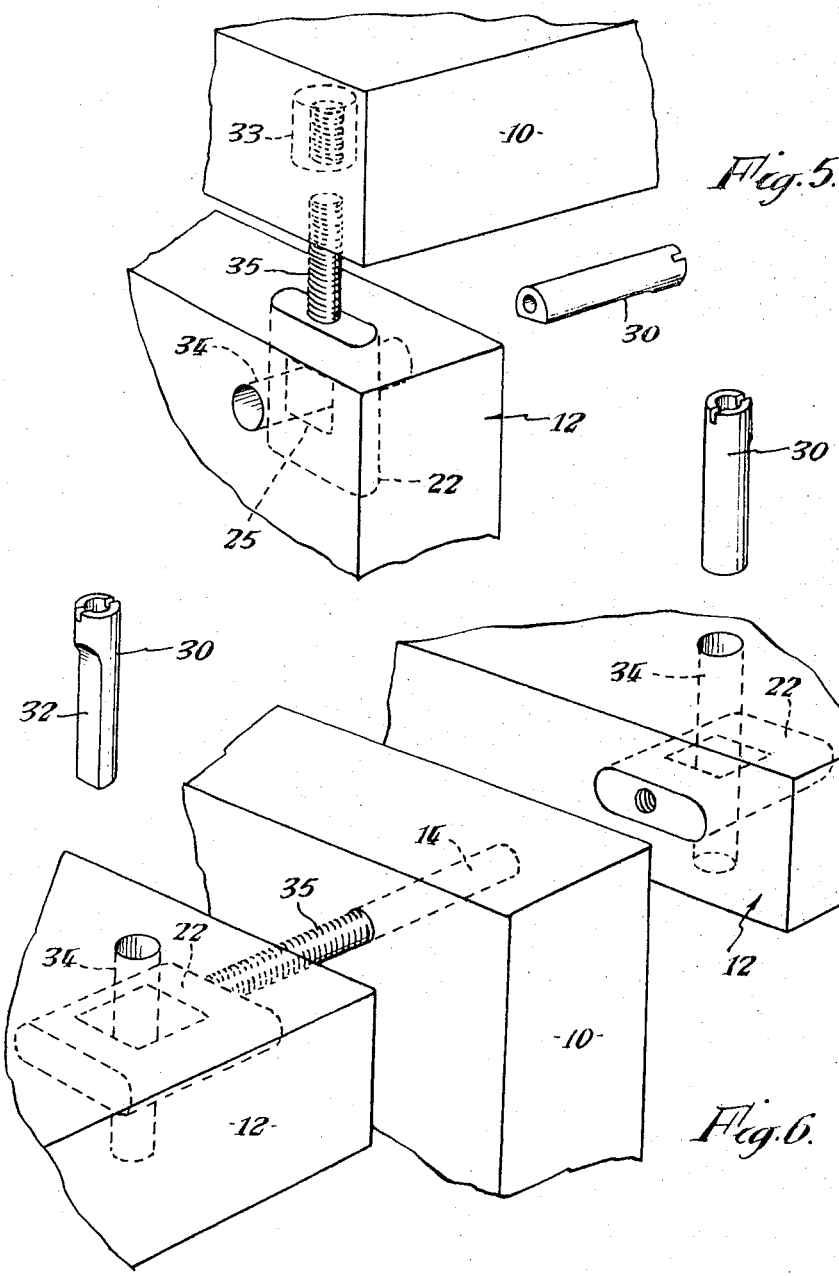

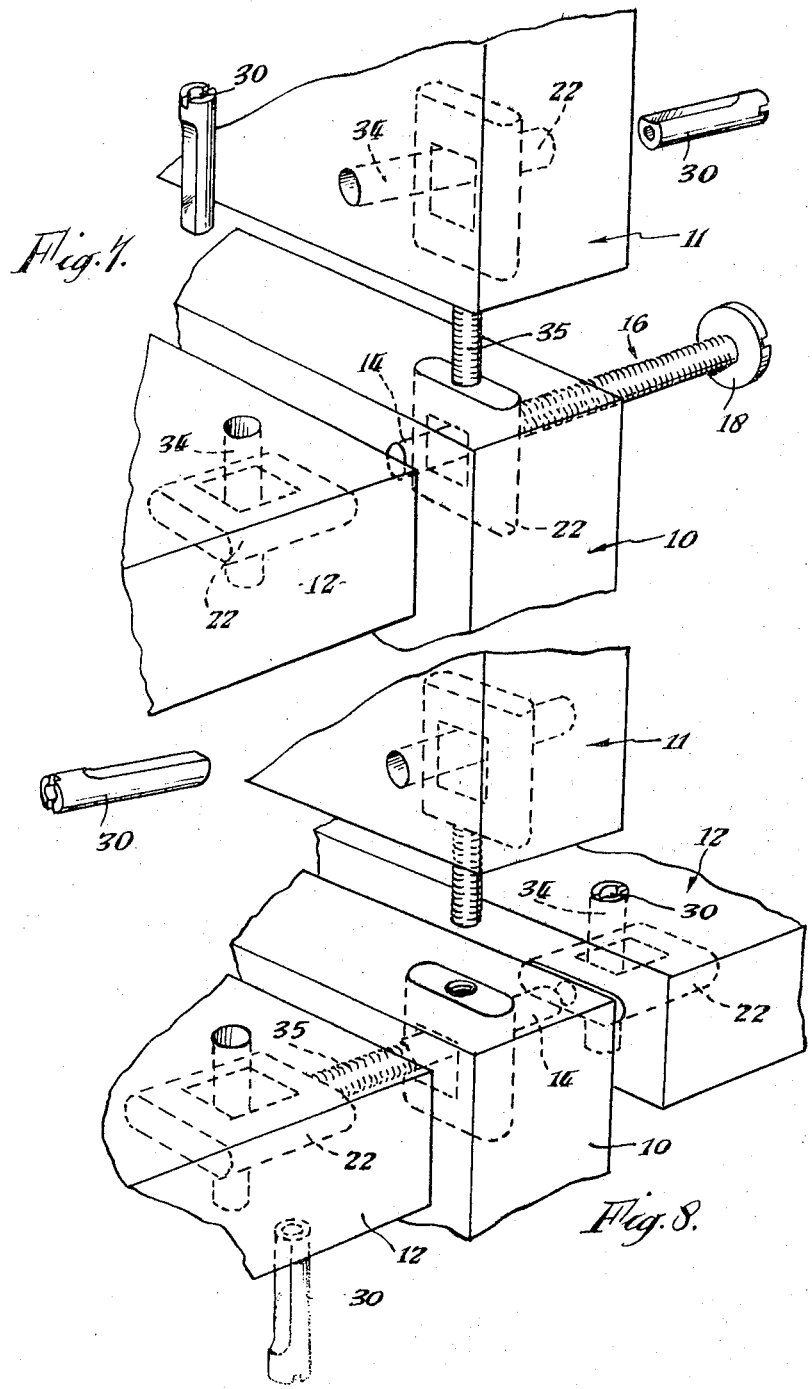

JOINT FOR JOINING STRUCTURAL MEMBERS

FIELD OF THE INVENTION

This invention relates to joining structural members, and is especially applicable to joining panels of substantial thickness at their edges to other panels or other structural members.

DESCRIPTION OF PRIOR ART

Various devices are known for joining structural members such as wooden panels of an article of furniture. Frequently, they consist of two parts, one secured to each of the two structural members, and means for joining the two parts. Often some means is provided for tightening the joint after assembly. Known joining devices are usually attached to or inset into the surface of at least one of the members so that the device is exposed in the assembled joint. This exposure facilitates later adjustment, where appropriate, but has the visual disadvantage of being unsightly and the structural disadvantage that at least one of the members is secured near its edge. A stronger, more rigid joint, should be possible where the members can be joined at positions spaced from their edges, thus producing firm abutment between the two members on both sides of the joining device instead of on only one side. Also, it is desirable that as little of the joint as possible is visible, while permitting tightening of the joint after assembly.

SUMMARY OF THE INVENTION

According to the present invention there is provided means for joining structural members, comprising an insert part attached or adapted for attachment to one of the members so as to project therefrom for insertion into a cavity in a second structural member, the insert part having a shoulder arranged so that it will lie within said cavity facing the first structural member, and a pin adapted for passing through an aperture in the second member in abutment with said shoulder so as to retain the insert part within the second member.

The pin preferably has a cross-section which at least in the region of said abutment provides a cam surface which is adapted on rotation of the pin to urge the insert part further into the cavity. The cross-section of the pin is preferably circular with a flat formed on one side.

A preferred form of the invention includes a screw part having a screw-threaded shank and adapted for attachment to a first structural member so that a screwthreaded end of the part projects therefrom, the insert part being threaded for attachment to the projecting end of the screw part.

The screw part may be provided with an enlarged head at one end of its shank so that it can be attached to a structural member at one end by passing the shank through a passage in the member.

The screw part may consist of a shank screw-threaded at both ends by which it is adapted for attachment to two structural members, for example by means of insert parts inset into both members and secured by said pins.

BRIEF DESCRIPTION OF DRAWINGS

In order that the invention may be more clearly understood, various embodiments will now be described with reference to the accompanying drawings wherein:

FIG. 1 is a perspective view of part of one form of joining means,

FIG. 2 is a perspective view of the pin,

FIG. 3 is a perspective exploded view of a first embodiment of joint,

FIG. 4 is a partly cut away view of the joint of FIG. 3, and

FIGS. 5, 6, 7 and 8 are perspective exploded views of further embodiments of joint.

DESCRIPTION OF THE PREFERRED EMBODIMENTS

Referring to the drawings, and firstly to FIGS. 1 to 4, two rigid panels 10, 12 of substantial thickness are being joined at right angles. A passage 14 is drilled through the panel 10, and a screw 16 having an enlarged head 18 is inserted in the passage so that its threaded end projects from the other side of the panel.

Opposite the projecting end of the screw 16 a cavity is formed in the end face 20 of the panel 12. The cavity is shaped to receive a plate 22, made for example from metal or plastics material, which has a uniform cross-section except for a cut-away part 24 which provides a shoulder 25. A screw-threaded passage 26 extends into the exposed face 28 of the plate to receive the projecting end of the screw 16.

The plate is retained in the cavity by means of a tubular dowel pin 30 which is generally cylindrical except for a flat face 32 formed along most of one side. The pin is inserted in a passage 34 drilled in the panel 12 so that the flat face 32 abuts the shoulder 25. At least one end of the pin is formed with a slot 36 to take a screwdriver. Alternatively it could be formed with a shaped aperture to receive a special key for turning the pin. The pin 30, by abutment with the shoulder 25, retains the plate 22 in the cavity. The panel 10 is tightened up against the end face of the panel 12 by tightening the screw 16. One or more other similar connections will usually be necessary to make a secure joint between the two panels.

FIG. 5 shows a similar joint between two panels 10, 12. In this case, however, instead of a passage 14 in the panel 10 to take a screw 16, a threaded nylon bush 33 is inset in the meeting face of the panel 10, and glued in place. A continuously screw-threaded shank 35 is screwed into the bush, and a plate 22 is screwed onto the projecting end of the shank 35. The plate is then inserted into the cavity in the panel 12 and is retained by the pin 30, as previously described. In this case, however, since, unlike the screw 16, the shank 35 is inaccessible for tightening up once the joint has been made, some other means must be found to tighten the two panels against each other. This is provided by rotating the pin 30 so that its round face is brought against the shoulder 25 of the plate 22. The plate is thus urged further into the cavity by an amount corresponding to the reduction in the diameter of the pin 30 produced by forming the flat face on it. This joint has the advantage over the joint of FIGS. 3 and 4 in that there is no screw head 18 visible once the joint has been made.

FIG. 6 shows a T-connection formed by joining the end faces of two panels 12 to a panel 10. Plates 22 are inset into the panels 12 and retained by pins 30, as previously described, and a passage 14 is drilled in the panel 10, as shown in FIG. 3. Instead of using a screw 16, however, a shank 35 threaded at each end is used. This shank is rather longer than the one used in the joint shown in FIG. 5, so that it can project from both ends of the passage 14 and engage in each of the plates 22. To assemble the joint, the shank 35 is passed through the passage 14 and the plates 22 are screwed onto each end. They are then inserted into the cavities in the panels 12 and the pins 30 are inserted so that their flat faces 32 abut the shoulders 25 of the plates. The joint is then tightened by rotating each of pins 30, as described with reference to the joint shown in FIG. 5.

FIG. 7 shows a T-shaped connection formed as a modification of the joint shown in FIGS. 3 and 4, wherein a panel 11 is butt-jointed onto the end of the panel 10. To effect this butt-jointing, a plate 22 is inset in a cavity in the end face of the panel 10 so that it will be retained therein by the shank of the screw 16 engaging its shoulder 25. A further plate 22 is inset in the end face of the panel 11 and retained by a pin 30. A continuously screw-threaded shank 35 joins the two plates 22 in the panels 10; the joint being tightened by means of the pin 30.

FIG. 8 shows a cross-shaped joint formed as a modification of the joint shown in FIG. 6 by butt-jointing a panel 11 onto the panel 10 by the same means as used in the joint shown in FIG. 7.

The pins 30 could be solid rather than tubular, but it is preferred to make them tubular so that threaded shanks 35 and the threaded parts of screws 16 can be passed through them. In the joints shown in FIGS. 7 and 8, for example, instead of a passage 14 to just take the threaded members, passages 34 could be drilled, pins 30 inserted and used to tighten the plates 22 through which they pass, and the threaded members passed through the pins 30. Also, the provision of a central passage through the pins permits a plug to be inserted after assembly and tightening of the joint, so that the ends of the pin are not visible.

We claim:

1. Means for joining structural members, comprising an insert plate, a locking pin, and means adapted for rigidly but detachably securing one end of the insert plate to a first structural member so as to project therefrom, the insert plate having the same external cross-section at each end so that it can be a close sliding fit within a cavity of similar cross-section in a second structural member, the insert plate having an aperture through which the locking pin can pass when inserted through a passage in the second structural member, whereby the plate is locked within the second structural member, the pin having a flat formed on one side, said flat being in engagement with the wall of the aperture in said insert plate and providing a cam section to the pin, whereby on rotation of the pin from a position in which the flat is in engagement with the plate on the side of the aperture remote from said one end the joint will be tensioned.

2. In an article of furniture which includes abutting panels, a joint between said panels comprising a plate rigidly secured at one end to the abutment surface of a first panel, said plate being circumferentially enclosed with a close sliding fit in a cavity in the opposite abutment surface of a second panel and in the same plane as the second panel, and a pin disposed in a passage in the second panel and extending through an aperture through the plate, said pin being in engagement with the plate on the side of the aperture remote from the first panel so as to retain the plate within the cavity, the pin having a flat on one side whereby the joint can be tensioned by rotation of the pin from a position in which the flat engages the plate.

3. A joint according to claim 2, in which an internally threaded bush is inset in the abutment surface of the first panel and is permanently secured therein against extraction and rotation, and a screw projects from said one end of the insert plate and engages in the bush to secure the plate to the first panel.

4. A joint according to claim 2, in which a screw extends from the plate through a passage in the first panel and into the edge of a third panel abutting the opposite face of the first panel.

5. A joint according to claim 4, in which a second said insert plate is similarly housed in a cavity in the edge of the third panel and similarly retained therein by a said pin, the screw connecting both plates through the passage in the first panel, whereby both plates are rigidly secured to the first panel.

6. A joint according to claim 4, in which a third said insert plate is housed in a cavity in an edge of the first panel so that the screw passes through the aperture in the plate and retains the plate within the cavity, the third plate being rigidly secured to the abutment surface of a fourth panel abutting the edge of the first panel.

7. A joint according to claim 6 in which the fourth panel abuts the first panel edge-to-edge, and a fourth said insert plate is housed in a cavity in the abutting edge of the fourth panel and retained therein by a said pin, a screw joining the third and fourth plates to secure together the first and fourth panels.

8. A joint according to claim 2 wherein the pin is of circular section except for the flat formed on one side.

9. A joint according to claim 2 wherein the insert plate is of plastics material.

10. Means according to claim 1 wherein the pin is of circular cross-section except for the flat formed on one side.

11. Means according to claim 1 wherein the insert plate is of plastics material.

* * * * *